United States Patent [19]

Nishikawa

[11] Patent Number: 4,578,839
[45] Date of Patent: Apr. 1, 1986

[54] AUTOMOBILE WINDSHIELD WIPER
[75] Inventor: Itaru Nishikawa, Zama, Japan
[73] Assignee: Nissan Motor Co., Ltd., Japan
[21] Appl. No.: 596,843
[22] Filed: Apr. 4, 1984
[30] Foreign Application Priority Data
  Jun. 24, 1983 [JP] Japan ............................ 58-96709[U]
[51] Int. Cl.⁴ ............................................. B60S 1/40
[52] U.S. Cl. ............................................... 15/250.32
[58] Field of Search ....................... 15/250.32–250.42
[56] References Cited
  U.S. PATENT DOCUMENTS
  2,694,827  11/1954  Bacher ............................. 15/250.32
  FOREIGN PATENT DOCUMENTS
  6600342  7/1965  Fed. Rep. of Germany .
  3021316  12/1981  Fed. Rep. of Germany ... 15/250.32
  3151644  7/1983  Fed. Rep. of Germany .
  2016912  9/1979  United Kingdom ............. 15/250.32

*Primary Examiner*—Peter Feldman
*Attorney, Agent, or Firm*—Leydig, Voit & Mayer, Ltd.

[57]  ABSTRACT

An automobile windshield wiper in which the wiper arm is detachably coupled with the wiper blade by overlap contact of a bent end portion of the wiper arm with a correspondingly bent portion of a leaf spring placed in the wiper blade. To improve sureness of the coupling, one of the leaf spring and the end portion of the wiper arm is formed with a projection and the other with a keyhole into which the projection fits. The leaf spring is so shaped as to allow a fingertip to find easy access to a free end portion of the leaf spring through a space between the leaf spring and the packing on the blade rubber for the purpose of disengaging the wiper blade from the wiper arm by distorting the leaf spring.

1 Claim, 6 Drawing Figures

AUTOMOBILE WINDSHIELD WIPER

BACKGROUND OF THE INVENTION

This invention relates to a windshield wiper for automobiles, and more particularly to an improvement in the mechanism of detachably coupling the wiper arm and the wiper blade using a leaf spring suitably shaped and held in the wiper blade.

In windshield wipers for automobiles, the wiper blade must be detachable from the wiper arm for the purpose of replacement. Customarily a clip is placed on and connected to the primary lever of a wiper blade assembly, and the wiper blade can be detachably coupled with the wiper arm by inserting the wiper arm tip into the clip.

Currently, some automobile windshield wipers are using a different method of coupling the wiper blade with the wiper arm. That is, a spring called a support spring, which is formed by bending a leaf spring so as to have a nearly U-shaped end portion, is held in the primary lever of the wiper blade. The support spring hooks over a retainer pin. The primary lever has an opening which provides access to the support spring. The tip portion of the wiper arm is bent in conformity with the U-shaped portion of the support spring. The bent tip portion of the wiper arm is inserted into the primary lever of the wiper blade to fit on the U-shaped portion of the support spring. When detaching the wiper blade from the wiper arm, a fingertip is inserted into the interior of the primary lever by using a space between the primary lever and the packing on the blade rubber in order to press a free end of the support spring to thereby release the tip portion of the wiper arm from the force of the support spring.

This coupling mechanism is simple in construction, but there is some doubt as to the sureness or stableness of the coupling since the coupling is made merely by the frictional contact of the U-shaped tip portion of the wiper arm with the similarly shaped support spring. Besides, the manipulation of the support spring in detaching the wiper blade from the wiper arm is troublesome because of the need of inserting the fingertip into the narrow space within the primary lever to touch the free end of the support spring. If this coupling mechanism is employed in a windshield wiper unit of the so-called hidden or concealed type, the fingertip must be inserted into the primary lever with much difficulty because the wiper blade cannot be kept apart from the windshield by raising the wiper arm.

SUMMARY OF THE INVENTION

It is an object of the present invention to provide an automobile windshield wiper, which employs a support spring of the above described type for coupling of the wiper blade with the wiper arm and is improved in the sureness of the coupling and also in the manipulatableness of the support spring in detaching the wiper blade.

An automobile windshield wiper according to the invention has a wiper arm and a wiper blade detachably coupled with the wiper arm. The wiper blade has a known lever sub-assembly which holds a packing to which a blade rubber is attached. The lever sub-assembly includes a coupling member, i.e. the support spring in the foregoing description, which is formed by bending a leaf spring so as to have a curved portion and held in an interior space in a central portion of the lever sub-assembly by a retainer pin fitted in the curved portion such that a free end portion of the coupling member faces the packing and is accessible through a space between the coupling member and the packing. An end portion of the wiper arm is bent in conformity with the curved portion of the coupling member and makes overlap contact with the curved portion of the coupling member. This windshield wiper is characterized in that one of the coupling member in the wiper blade or the curved end portion of the wiper arm is formed with a projection on a surface facing the other and the other is formed with a keyhole into which the projection fits when the end portion of the wiper arm comes into overlap contact with the curved portion of the coupling member, and that the coupling member is further bent such that the distance of the coupling member from the packing becomes shorter in the free end portion than in the other portions.

In the windshield wiper according to the invention, very sure and stable coupling of the wiper arm with the wiper blade is made since the aforementioned projection or key remains fitted in the keyhole. When the free end portion of the coupling member is pressed to distort the coupling member to thereby release the end portion of the wiper arm from the spring force of the coupling member, the projection disengages from the keyhole without the need of any extra action. Since the free end portion of the coupling member is deflected toward the packing, the manipulation of the coupling member in detaching the wiper blade from the wiper arm can easily be made without inserting the fingertip deep into the interior of the lever of the wiper blade.

DESCRIPTION OF THE PREFERRED EMBODIMENTS

Figure 1:
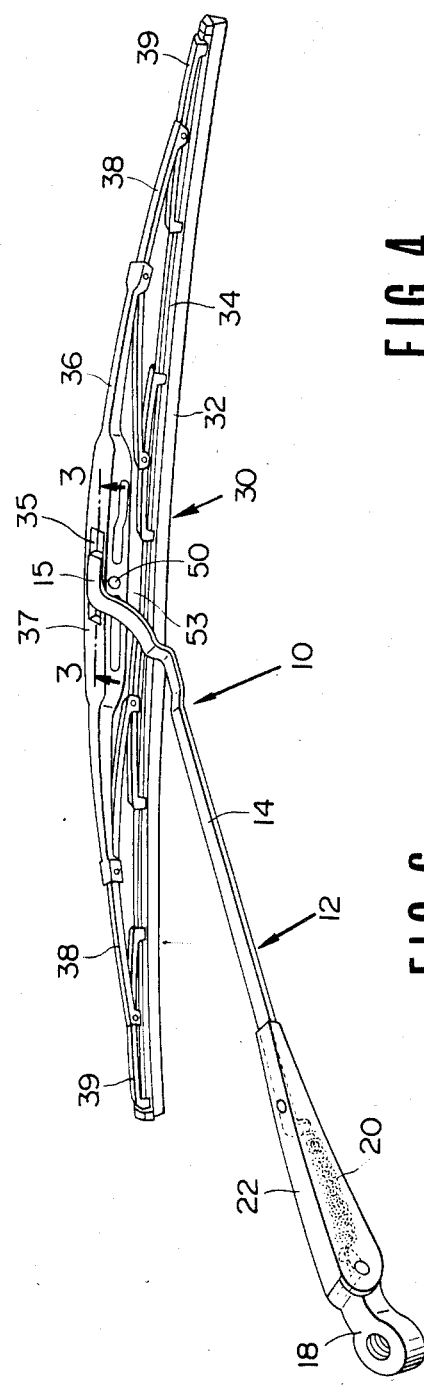
FIG. 1 is a perspective view of a windshield wiper to which the present invention is applied.
Figure 2:
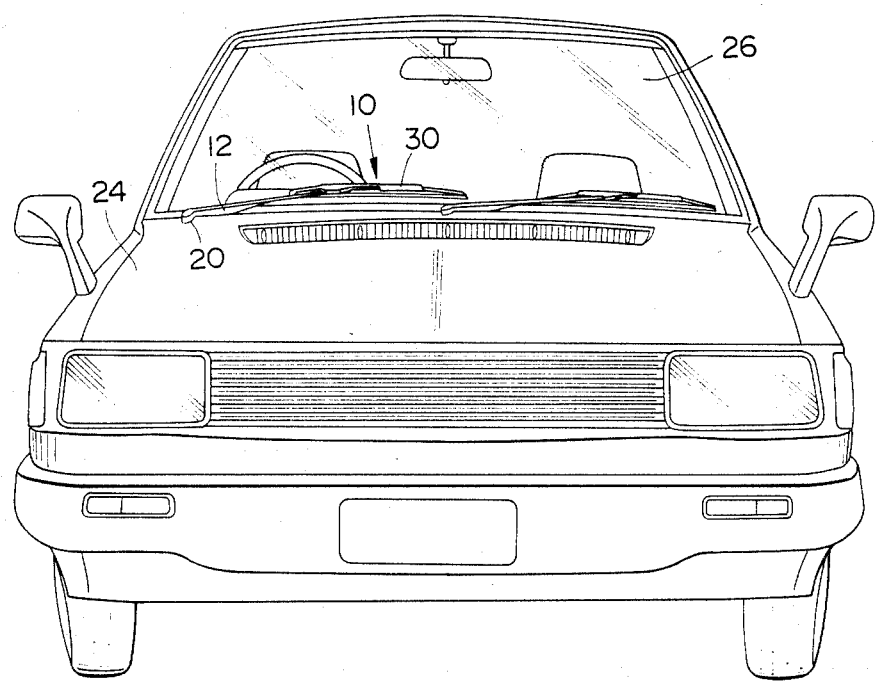
FIG. 2 is a front view of an automobile on which the windshield wipers of FIG. 1 are installed.

As shown in FIG. 1, a windshield wiper 10 according to the invention is similar in its fundamental construction and appearance to a conventional one. A wiper blade 30 is detachably attached to a wiper arm 12, which is basically an assembly of an elongate arm piece 14, an arm head 18, a helical compression spring 20 and a retainer 22 which is coupled with the arm head 18 and receives therein the spring 20 and an end portion of the arm piece 14. The wiper blade 30 is an assembly of a blade rubber 32, a packing 34 which is a leaf spring shaped so as to hold the blade rubber 32, a primary lever 36, two secondary levers 38 and four tertiary levers 39. This windshield wiper 10 is installed on an automobile, as shown in FIG. 2, by fixing the arm head 18 to a rotatable shaft (not shown) protruding from a car body panel 24. By the force of the spring 20 in the wiper arm 12, the blade rubber 32 in the wiper blade 30 keeps in close contact with the windshield 26.

Figure 4:
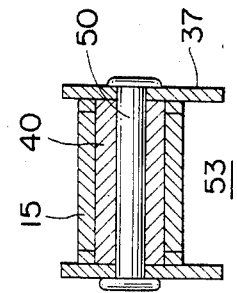
FIG. 4 is a sectional view taken along the line 4—4 in FIG. 3.
Figure 3:
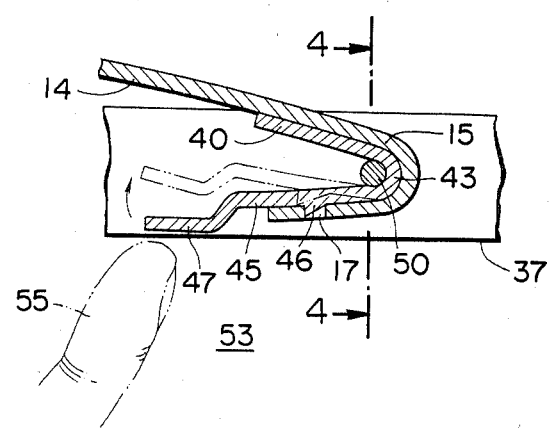
FIG. 3 is an enlarged sectional view taken along the line 3—3 in FIG. 1, showing the manner of coupling the wiper blade with the wiper arm in the wiper according to the invention.
Figure 5:
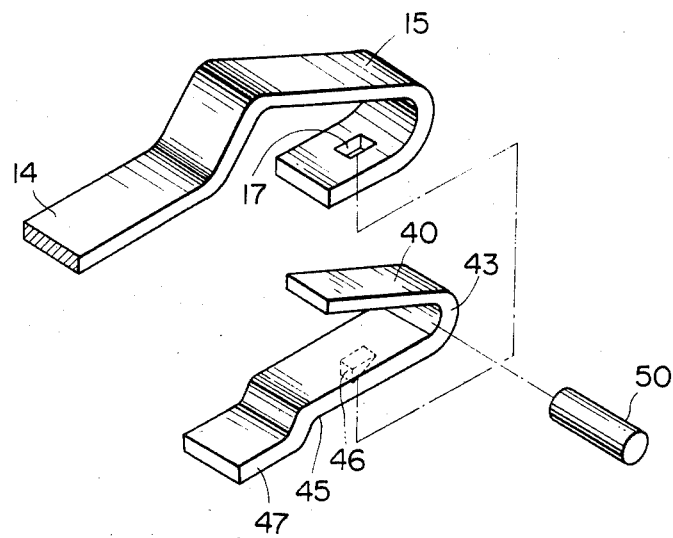
FIG. 5 is an exploded view of the coupling mechanism in FIG. 3.

Referring to FIGS. 3 to 5 as well as FIG. 1, an end portion 15 of the arm piece 14 is coupled with a middle portion 37 of the primary lever 36 of the wiper blade 30. In the middle portion 37 the primary lever 36 is formed with an opening 35 through which the packing 34 can be seen from the outside of the primary lever 36. In the interior of the middle portion 37 of the primary lever 36, there is a support spring 40 which is formed by bending a leaf spring so as to have a nearly U-shaped end portion 43. To hold the support spring 40 in position, a pin 50 is fixedly put in the primary lever 36 so as to engage with the curved inside of the U-shaped portion 43 of the support spring 40. In a middle portion and on the underside facing the packing 34, the support spring 40 is formed with a wedge-shaped projection 46. The boundary between the middle portion 45 and the other end portion 47 of the support spring 40 is a stepwise bend so that the distance between the support spring 40 and the packing 34 becomes shorter in this end portion 47.

The end portion 15 of the arm piece 14 is bent so as to become nearly U-shaped in conformity with the nearly U-shaped portion 43 of the support spring 40. The coupling of the wiper arm 12 with the wiper blade 30 is made basically by fitting the nearly U-shaped end portion 15 of the arm piece 14 on the outside of the nearly U-shaped portion 43 of the support spring 40. Furthermore, the end portion 15 of the arm piece 14 is formed with a keyhole 17 at such a location that the wedge-shaped projection 46 of the support spring 40 fits into this keyhole 17. So long as the projection or key 46 remains fitted in the keyhole 17 the wiper blade 30 remains very surely coupled with the wiper arm 12.

A space 53 between the pair of edges 37A, 37B of the middle portion 37 of the primary lever 36 opposited the packing 34 of the wiper blade 30 provides access to the support spring 40 which serves as a coupling member disposed in the interior of the primary lever 36. The free end portion 47 of the coupling member 40 is bent stepwise at a point spaced beyond the end 15A of the end portion 15 of the wiper arm piece 14 and extends substantially parallel with and below (as illustrated in FIG. 3) the portion adjacent the end 15A and has an outer surface 47A substantially flush with the edges 37A, 37B of the middle portion 37 of the lever 36, as shown in FIG. 3. To detach the wiper blade 30 from the wiper arm 12 for replacement, the free end portion 47 of the coupling member or support spring 40 is pressed upward with a fingertip 55 inserted into the space 53 until distortion of the support spring 40 with the pin 50 as a fulcrum causes disengagement of the projection 46 from the keyhole 17. Since the coupling member or support spring 40 is bent so as to shorten the distance between the free end portion 47 and a packing 34, the fingertip 55 inserted into the space 53 touches the free end portion 47 of the spring 40 before inserting the fingertip 55 deep into the interior of the primary lever 36. Therefore, the detachment of the wiper blade 30 can easily be accomplished even in the case of a windshield wiper unit of the concealed type where the wiper arm 12 cannot be raised.

It will be understood that the above described advantages can similarly be obtained also when the end portion 15 of the arm piece 14 is formed with a projection, which serves as a key, in place of the illustrated keyhole 17 and the support spring 40 with a keyhole in place of the illustrated projection 46.

Figure 6:
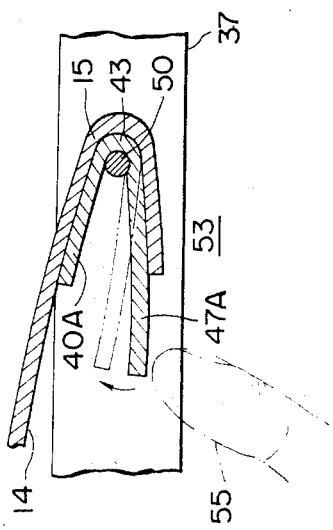
FIG. 6 shows a conventional manner of coupling the wiper blade with the wiper arm in a sectional view corresponding to FIG. 3.

In conventional windshield wipers which are nearly identical with the wiper shown in FIGS. 1 and 3-5, the coupling of the arm piece 14 with the primary lever 36 of the wiper blade 30 is made in the manner as shown in FIG. 6. The pin 50 and a support spring 40A having a nearly U-shaped end portion 43 in FIG. 6 are almost similar to the counterparts in FIG. 3, but the support spring 40A has neither a projection to serve as a key nor a keyhole and extends substantially straightly from the bend in the nearly U-shaped portion 43 to the free end 47A. The nearly U-shaped end portion 15 of the arm piece 14 is almost similar to the counterpart in FIG. 3 except that no keyhole is formed in this end portion 15. Accordingly the coupling of the arm piece 12 with the primary level 36 of the wiper blade 30 is made merely by frictional contact of the inner surface of the U-shaped end portion 15 of the arm piece 12 with the outer surface of the U-shaped portion 43 of the support spring 40A. For this reason the coupling is not so sure and stable as in the case of the coupling mechanism shown in FIG. 3. Besides, detachment of the wiper blade 30 from the wiper arm 12 is not so easy because a fingertip 55 must be inserted into the interior of the primary lever 36 through the space 53 to push the innerly positioned free end 47A of the support spring 40A. This becomes a serious inconvenience in the case of a windshield wiper unit of the concealed type.

What is claimed is:

1. An automobile windshield wiper having a wiper arm member and a wiper blade detachably coupled with the wiper arm member, the wiper blade having a lever sub-assembly which holds the packing to which a blade rubber is attached, the lever sub-assembly including a coupling member which is formed by bending a leaf spring so as to have a curved portion and held in an interior space in a central portion of the lever sub-assembly by a retainer pin fitted in the curved portion such that a free end portion of the coupling member faces the packing, said central portion of the lever sub-assembly having a pair of edges opposite the packing providing a space through which the coupling member is accessible, an end portion of the wiper arm member being bent in comformity with the curved portion of said coupling member and making overlap contact with the curved portion of the coupling member, the improvement comprising a key projecting from one of said coupling member and said end portion of the wiper arm member on a surfce facing the other member and the other member being formed with a keyhole into which said key fits when said end portion of the wiper arm member comes into overlap contact with the curved portion of the coupling member, and a free end portion of said coupling member bent stepwise at a point spaced beyond the end of the end portion of the wiper arm member and extending substantially parallel with and below said end portion of the wiper arm member and having an outer surface substantially flush with said edges of the central portion of the lever sub-assembly such that the distance of the coupling member from said packing becomes shorter in said free end portion than in the adjacent portion, allowing a fingertip inserted into said space to touch said free end portion of said coupling member without being inserted into the interior space of said central portion and to press the coupling member into said interior space until distortion of the coupling member, with the retaining pin as a fulcrum, causes disengagement of the key from the keyhole and complete coupling member disengagment allowing the wiper arm member to be detached from the lever sub-assembly.

* * * * *